April 6, 1954 R. S. MANNE 2,674,637
ALKYLATION OF AN ISOPARAFFIN WITH AN OLEFIN BY
A TWO-STAGE FRIEDEL-CRAFTS CATALYTIC PROCESS
Filed May 31, 1950

INVENTOR.
Richard S. Manne,
BY
AGENT.

Patented Apr. 6, 1954

2,674,637

UNITED STATES PATENT OFFICE

2,674,637

ALKYLATION OF AN ISOPARAFFIN WITH AN OLEFIN BY A TWO-STAGE FRIEDEL-CRAFTS CATALYTIC PROCESS

Richard S. Manne, Baytown, Tex., assignor, by mesne assignments, to Standard Oil Development Company, Elizabeth, N. J., a corporation of Delaware Application May 31, 1950, Serial No. 165,315

4 Claims. (Cl. 260—683.4)

The present invention may be briefly described as involving the alkylation of isobutane with ethylene in which an alkylatable feed mixture of isobutane and ethylene is contacted with a Friedel-Crafts catalyst in a first alkylation stage at a temperature in the range between 120° and 160° F. whereby a product is formed which is separated from the catalyst in the first stage. This product, which contains unconverted isobutane and ethylene, is then contacted with a Friedel-Crafts catalyst in a second alkylation stage at a temperature in the range between 80° and 120° F. The feed mixture is passed through the first stage and the product from the first stage is passed through the second stage at an overall space velocity no greater than 3.0 volumes of feed mixture per volume of catalyst per hour. By proceeding in accordance with this method it is possible to produce an alkylate having a maximum concentration of 2,3-dimethylbutane at minimum overall consumption of catalyst in two stages.

The present invention will be further described by reference to the drawing in which.

Figure 1:
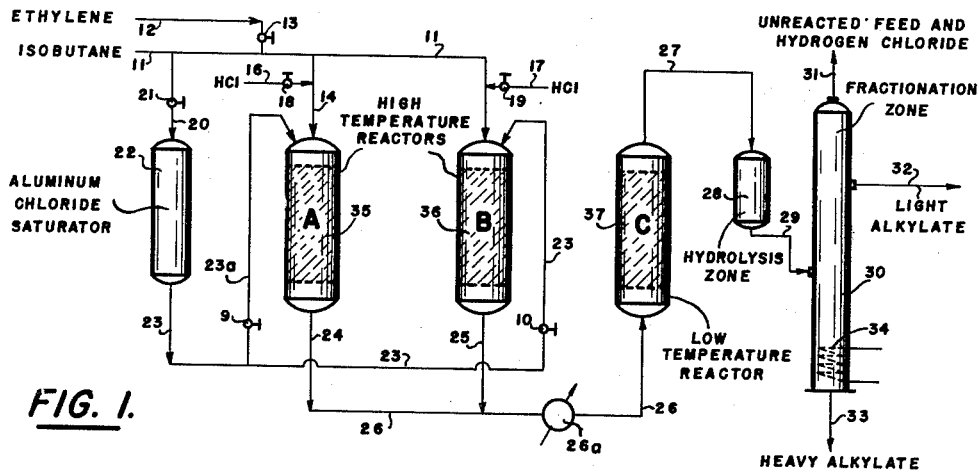
Fig. 1 is a flow diagram of a preferred mode of practicing my invention.

Referring now to the drawing and specifically to Fig. 1, A and B designate high temperature reactors and C designates a low temperature reactor, high temperature reactors A and B being connected in parallel and low temperature reactor C being connected in series with high temperature reactors A and B in a manner to be described. It is understood that reactors A and B and reactor C are provided with heat control means to maintain the desired temperature level therein.

Isobutane from a source not shown is introduced into the system by way of line 11, while ethylene also from a source not shown is introduced into the system by a parallel line 12 which is controlled by a valve 13 and connects into line 11. Isobutane line 11, into which ethylene line 12 connects, connects by lines 14 and 15 with high temperature reactors A and B. Lines 14 and 15 are provided with lines 16 and 17 controlled respectively by valves 18 and 19 through which hydrogen chloride may be introduced into reactors A and B from a source of hydrogen chloride, not shown. Branching off from line 11 is a branch line 20 controlled by valve 21 which allows a portion of the isobutane to be routed through an aluminum chloride saturator 22 wherein there is deposited a bed of aluminum chloride. Discharging from aluminum chloride saturator 22 are lines 23a and 23 controlled, respectively, by valves 9 and 10 which allow isobutane containing aluminum chloride in solution to be discharged directly into reactors A and B.

The product from high temperature reactors A and B discharges therefrom by lines 24 and 25 into line 26 whereby the product from reactors A and B is discharged through cooler 26a into a low temperature reactor C. The product from low temperature reactor C is withdrawn therefrom by line 27, by way of which the alkylate containing product from reactor C may be routed through a hydrolysis or caustic washing zone 28 and thence by line 29 into a fractionation zone 30.

Fractionation zone 30 is provided with lines 31, 32, and 33 by way of which unreacted feed and hydrogen chloride, light alkylate, and heavy alkylate, respectively, may be discharged therefrom. It is understood that fractionation zone 30 may be a series of fractionating columns provided with internal baffle equipment such as bell cap trays, packing such as Raschig rings, and the like, to insure intimate contact between liquid and vapors. Fractionation zone 30 is also provided with a heating means illustrated by steam coil 34.

In practicing the present invention it will be assumed that high temperature reactors A and B are provided with a bed of aluminum chloride or other Friedel-Crafts catalyst on a porous support. The beds of aluminum chloride in reactors A and B are generally indicated by the shaded portions 35 and 36. Similarly, low temperature reactor C is provided with a bed of supported aluminum chloride indicated by the shaded portion 37. The aluminum chloride in reactors A, B and C may be introduced thereto by by-passing a portion of the isobutane from line 11 by line 20 through aluminum chloride saturator 22 and thence back into line 11 and thence to reactors A and B by lines 14 and 15, the porous catalyst support picking up aluminum chloride from the isobutane and allowing it to be deposited thereon. The aluminum chloride in reactor C may be deposited thereon in a similar manner by means not shown, but similar to those provided for reactors A and B. Preferably, however, the aluminum chloride in reactor C, in which a bed of a porous support is provided, is deposited thereon from the product from reactors A and B carrying aluminum chloride therefrom. It is well known that the solubility of aluminum chloride is such that a hydrocarbon liquid at a reaction temperature such as used in the practice of the present invention will carry aluminum chloride from a bed of supported catalyst and will allow the aluminum chloride to be deposited on a subsequent bed of a porous support.

In the practice of the present invention it will be assumed that the high temperature reactors A and B are maintained at a temperature in the range between 120° and 160° F. A preferred temperature for the high temperature reactors is in the range between 130° and 140° F., while a preferred temperature for the low temperature reactor is in the range from 95° to 105° F. A feed mixture of isobutane and ethylene in the mole ratio of 5 to 1 is discharged into reactors A and B at a feed rate of about 3 volumes of feed per volume of catalyst per hour in admixture with hydrogen chloride in an amount in the range between 0.04 and 4.0 mole per cent based on ethylene to promote the reaction. As the alkylatable feed mixture passes through reactors A and B in the presence of promoter and in contact with the catalyst, the isobutane is alkylated with the ethylene to form a product comprising 2,3-dimethylbutane. The amount of makeup $AlCl_3$ added to reactors A and B is the minimum amount required to maintain substantially complete conversion in the total reactor system. At optimum reaction conditions, with substantially no contaminants in the feed, this may be as low as 0.02 pound $AlCl_3$ per gallon of alkylate produced. At the high temperatures prevailing in reactors A and B and at the feed rate of about 3 volumes of feed per volume of catalyst per hour, the product leaving by lines 24 and 25 and discharging into line 26 contains a relatively high concentration of ethylene because of incomplete contacting of the feed with the catalyst in reactors A and B. The conversion obtained in reactors A and B will be in the range from 70 to about 90 per cent, based on the ethylene. This insures a relatively high concentration of 2,3-dimethylbutane in the product since the conversion level corresponding to the diminishing concentration of 2,3-dimethylbutane will not have been reached. Thereafter the product from reactors A and B after passage through cooler 26a where its temperature is reduced is contacted with catalyst at relatively low temperatures in reactor C where the conditions are more favorable at high conversions obtainable therein for production of 2,3-dimethylbutane. Thus, the feed rate of product to the reactor C will be approximately 6 volumes per volume of catalyst per hour. Since reactors A, B, and C are of the same size and reactors A and B are operated in parallel, the overall feed rate to the process is 2 volumes of feed per volume of catalyst per hour.

In carrying out my invention it is not necessary that the space velocity in the second stage be twice that in the first stage, as shown in the above example, so long as the overall liquid hourly space velocity of the process is no greater than 3 volumes of feed per volume of catalyst per hour, and the conversion in the first stage is held sufficiently low to prevent breakdown of the 2,3-dimethylbutane produced therein. For example, I may operate my process with a single reactor in the first stage and a single reactor in the second stage, both reactors being of the same size and each reactor operating at a space velocity of 4 volumes of feed per volume of catalyst per hour, the temperature in the first stage again being in the range between 120° and 160° F. and preferably between 130° and 140° F., and the temperature in the second stage being between 80° and 120° F. and preferably between 95° and 105° F. With an aluminum chloride addition rate of about 2 weight per cent based on the ethylene, the conversion in the first reactor will be about 75% and the final conversion will be substantially 100% based on ethylene. Thus, the overall space velocity of the system in this case is 2 volumes of feed per volume of catalyst per hour. The relative space velocities in the two stages may be arranged at any desired value so long as that in the first stage is at least about 3 volumes of feed per volume of catalyst per hour and the aluminum chloride feed rate to the system is substantially the minimum rate required to give substantially complete conversion of the ethylene. In general it is advantageous to obtain as much conversion as possible without deteriorating 2,3-dimethylbutane in the first conversion stage since no refrigeration is required in that stage, the heat for the higher temperature usually being supplied by the heat of reaction. Thus, economy is obtained by carrying out only the relatively small amount of conversion in the final stage at the lower temperature requiring refrigeration.

Figure 3:
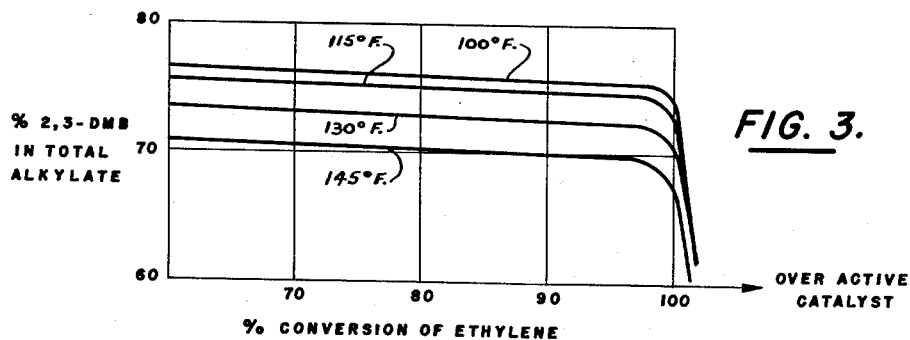
Fig. 3 is a plot of data showing the relationship between the concentration of 2,3-dimethylbutane in the total alkylate and the percentage conversion of ethylene in the feed mixture.

It has been observed that increasing the space velocity above 2 liquid volumes per volume of catalyst per hour results in a decrease in conversion which may be compensated for only by increasing the amount of catalyst. The concentration of 2,3-dimethylbutane in the alkylate varies inversely with conversion at any set reaction temperature, but falls off only slightly in the range between 60 and 90% conversion. This is shown graphically in Fig. 3 where a sharp decrease in selectivity is noted as 100% conversion is approached. This applies for operations at temperatures within the range given. Furthermore, it has been noted that the catalyst requirement decreases with lower temperatures. It is postulated that this may be due to the physical effect of higher aluminum chloride solubility in the hydrocarbons at the high temperatures. This carryover is roughly proportional to the solubility of aluminum chloride in the reactor effluent.

Thus, it will be seen that the present invention involves a two-stage alkylation process wherein isobutane is alkylated with ethylene in which the product from a first stage is fed into a second stage, the first stage being maintained at a higher temperature than the second stage and the first stage being roughly twice the size of the second stage. Stating this otherwise, by operating a lead alkylation stage at a space velocity substantially less than the space velocity of a second alkylation stage, with the product from the first stage being fed to the second stage and the temperature in the first alkylation stage being substantially higher than that in the second alkylation stage, it is possible to maintain an overall space velocity no greater than 3.0 and to minimize consumption of aluminum chloride while maintaining maximum production of the desirable alkylation product, in this particular instance 2,3-dimethylbutane.

The invention will be further illustrated by a number of runs wherein a mixture of ethylene and isobutane was charged at varying feed rates to contact with a bauxite supported aluminum chloride catalyst. In these runs the reactor temperature and pressure were maintained at a constant value, but the feed rate was varied in the range from 1 to 4 liquid volumes of feed per volume of catalyst per hour. The results of these runs are presented in Table I.

TABLE I

*Effect of feed rate*

| Feed Rate, Liquid V./V. Hr. | 1 | 2 | 3 | 3.6 | 4.0 |
|---|---|---|---|---|---|
| Reactor Temperature, °F | 130 | 130 | 130 | 130 | 130 |
| Reactor Pressure, p. s. i. g | 275 | 275 | 275 | 275 | 275 |
| Lb. AlCl₃/Gal. Alky | 0.026 | 0.024 | 0.033 | 0.036 | 0.041 |
| Percent Conversion of Ethylene | 98.9 | 98.9 | 98.5 | 95.1 | 87.0 |
| Wt. Percent Alkylate, Calculated | 283 | 285 | 281 | 283 | 282 |
| Percent 2,3-Dimethylbutane in Total Alkylate | 72 | 72 | 73 | 74 | 74 |

It will be seen from this data that as the feed rate varied, at a constant temperature and pressure, the amount of aluminum chloride necessary to maintain substantially constant conversion increased with the feed rate. It will also be noted that maximum conversion with minimum consumption of aluminum chloride was obtained at space velocities up to 2 volumes per volume of catalyst per hour.

Additional data were obtained at reactor temperatures varying between 100° and 145° F., at feed rates varying between 1 and 3 volumes of feed per volume of catalyst per hour at a constant reactor pressure. These data are presented in Table II.

TABLE II

*Effect of reactor temperature on catalyst requirements and 2,3-dimethylbutane production*

| Reactor Temperature, °F | 145 | 140 | 130 | 115 | 100 |
|---|---|---|---|---|---|
| Vol. Feed/Vol. Catalyst/Hr | 3 | 3.0 | 3.0 | 1.0 | 3.0 |
| Reactor Pressure, p. s. i. g | 275 | 275 | 275 | 275 | 275 |
| Lb. AlCl₃Gal. Alkylate min | 0.053 | 0.050 | 0.046 | 0.034 | 0.030 |
| Wt. Percent Alkylate, Calculated | 280 | 281 | 286 | 279 | 277 |
| Percent Conversion of Ethylene | 86 | 85 | 86 | 96 | 84 |
| Percent 2,3-Dimethylbutane in total alkylate | 69 | 71 | 74 | 74.5 | 74.5 |

Figure 2:
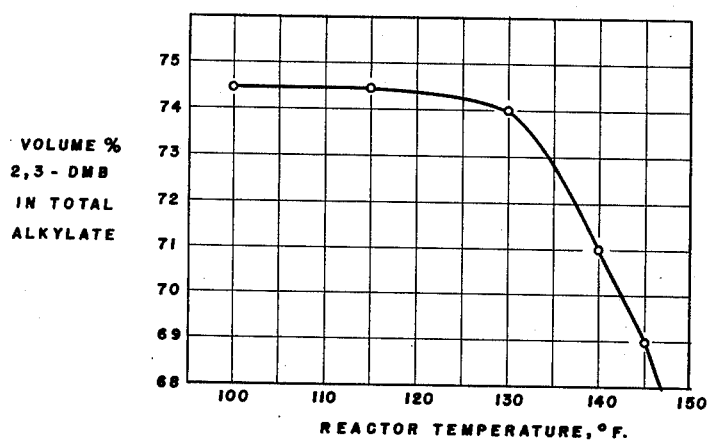
Fig. 2 is a graph of data showing the relationship between the concentration of 2,3-dimethylbutane in the total alkylate and the reactor temperature.

It will be noted from the data in the foregoing table that the aluminum chloride consumption was greatest at the highest temperatures and that the percentage of 2,3-dimethylbutane in the alkylate remains substantially constant at a temperature between 100° and 130° F. On the other hand, it will be noted that the aluminum chloride consumption was the lowest at the lower temperatures. The results shown in Table II are also presented graphically in Fig. 2.

Additional data were obtained wherein the relationship between the 2,3-dimethylbutane in the total alkylate and the per cent conversion of ethylene were determined. These data are shown graphically in Fig. 3 and illustrate that at conversions varying from 60 to 100% at varying temperatures there is a sharp break in 2,3-dimethylbutane concentration as the conversion approaches 100%. It is thus possible to provide a process in which a series of alkylation stages is maintained with a lead stage operating at a high temperature and a tail stage operating at a low temperature, the two stages being proportioned in a ratio of 2 to 1 such that the feed rate in the tail stage may be twice as great as that in the lead stage. Relatively low temperatures are maintained in the tail stage at relatively high feed rates insuring an overall feed rate not in excess of 3 volumes of feed per volume of catalyst per hour and allowing maximum production of 2,3-dimethylbutane with minimum consumption of catalyst, the catalyst carry-over from the lead stage being utilized in the tail stage to catalyze the reaction therein.

The catalysts employed in the practice of the present invention will include the slightly hydrocarbon soluble Friedel-Crafts catalysts among which is aluminum chloride, the commonest, and may also include ferric chloride, titanium tetrachloride, zirconium chloride, gallium chloride, indium chloride and many others too numerous to mention here. It will be preferred, however, to use aluminum chloride in both reactors.

The preferred mole ratio of isobutane to ethylene in the feed to the first stage is about 5 to 1, but ratios in the range from 3 to 1 to 15 to 1 or higher may be employed.

As mentioned before, temperatures in the high temperature reactors may be in the range from 120° to 160° F. and in the low temperature reactor from 80° to 120° F., but preferably the temperatures will be in the range from 130° to 140° F. in the lead reactors and 95° to 105° F. in the tail reactor. Pressures employed in the present invention should be sufficient to maintain a liquid phase at the temperature employed. A pressure of 275 p. s. i. g. at 130° F. gives satisfactory results. However, lower pressures may be employed, such as 225 p. s. i. g. at 130° F. which corresponds to the bubble temperature for a feed mixture containing 40% ethylene employing a 5 to 1 isobutane ratio. Actually, pressures lower than that necessary to maintain a liquid phase may be employed wherein a mixed phase would result. However, pressures below the bubble point may result in the reduction of the 2,3-dimethylbutane present in the alkylate. Therefore, it may be undesirable to employ a pressure lower than 175 to 200 p. s. i. g.

While it is desirable to operate with a feed of isobutane and ethylene substantially free of impurities such as carbon monoxide and acetylene, it is possible to operate with feeds containing small amounts of these impurities.

The nature and objects of the present invention having been completely described and illustrated, what I wish to claim as new and useful and to secure by Letters Patent is:

1. A method for alkylating isobutane with ethylene which comprises forming an alkylatable feed mixture of isobutane and ethylene, contacting said mixture with a slightly hydrocarbon soluble Friedel-Crafts catalyst in a first alkylation stage at a temperature in the range between 130° and 140° F. to form a product, removing said product from contact with said catalyst in said first stage, and contacting said product with said Friedel-Crafts catalyst in a second alkylation stage at a temperature in the range between 95° and 105° F., said feed mixture being fed to said first stage and said product being fed to said second stage at an overall space velocity no greater than 3 volumes of said feed per volume of catalyst per hour, whereby alkylate having a maximum concentration of 2,3-dimethylbutane is recovered from said second stage at minimum overall consumption of catalyst in said stages.

2. A method in accordance with claim 1 in which the Friedel-Crafts catalyst in the second stage is carried thereto by the product from the first stage.

3. A method for alkylating isobutane with ethylene which comprises forming an alkylatable feed mixture of isobutane and ethylene, contacting said feed mixture with a supported aluminum chloride catalyst in a first alkylation step at a temperature in the range between 130° and 140° F. to form a product, removing said product from contact with said catalyst in said first stage and contacting said product with a supported aluminum chloride catalyst in a second alkylation stage at a temperature in the range between 95° and 105° F., said feed mixture being fed to said first stage at a space velocity no less than 3 volumes of feed per volume of catalyst per hour and said product being fed to said second stage at a space velocity sufficient to provide an overall space velocity no greater than 3 volumes of feed per volume of catalyst per hour in said stages, to form a second product, removing said second product from contact with catalyst in said second stage, whereby alkylate having a maximum concentration of 2,3-dimethylbutane is recovered from said second stage at minimum overall consumption of catalyst in said stages.

4. A method in accordance with claim 3 in which the aluminum chloride catalyst in the second stage is carried thereto by the product from the first stage.

References Cited in the file of this patent

UNITED STATES PATENTS

| Number | Name | Date |
|---|---|---|
| 2,196,831 | Hull | Apr. 9, 1940 |
| 2,236,099 | Ipatieff et al. | Mar. 25, 1941 |
| 2,266,012 | D'Ouville et al. | Dec. 16, 1941 |
| 2,298,383 | Ipatieff et al. | Oct. 13, 1942 |
| 2,313,661 | Montgomery | Mar. 9, 1943 |
| 2,324,746 | Weinrich et al. | July 20, 1943 |
| 2,349,516 | Pines et al. | May 23, 1944 |
| 2,351,354 | McMillan | July 13, 1944 |
| 2,409,389 | Ringham | Oct. 15, 1946 |
| 2,416,395 | Kuhn | Feb. 25, 1947 |